(12) United States Patent
Jones et al.

(10) Patent No.: US 8,327,456 B2
(45) Date of Patent: Dec. 4, 2012

(54) MULTIPLE ENTITY AUTHORIZATION MODEL

(75) Inventors: Jeffrey Dick Jones, Woodinville, WA (US); Sean Patrick Nolan, Bellevue, WA (US); Johnson T. Apacible, Mercer Island, WA (US); Vijay Varadan, Bellevue, WA (US); Brian J. Guarraci, Redmond, WA (US); Christopher C. White, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 11/855,251

(22) Filed: Sep. 14, 2007

(65) Prior Publication Data

US 2008/0256643 A1 Oct. 16, 2008

Related U.S. Application Data

(60) Provisional application No. 60/911,794, filed on Apr. 13, 2007.

(51) Int. Cl.
| | |
|---|---|
| G06F 7/04 | (2006.01) |
| G06F 17/30 | (2006.01) |
| G06F 17/00 | (2006.01) |
| G06F 15/16 | (2006.01) |
| G06F 12/00 | (2006.01) |
| G06F 12/14 | (2006.01) |
| G06F 13/00 | (2006.01) |
| H04N 7/16 | (2011.01) |
| H04L 29/06 | (2006.01) |
| G11C 7/00 | (2006.01) |
| G06Q 50/00 | (2012.01) |

(52) U.S. Cl. ............ 726/27; 726/28; 726/29; 726/30; 726/1; 726/4; 726/17; 726/21; 705/3; 707/781

(58) Field of Classification Search ............ 726/27–30; 705/2–3

See application file for complete search history.

(56) References Cited

U.S. PATENT DOCUMENTS

| | | | |
|---|---|---|---|
| 5,339,403 A | 8/1994 | Parker | |
| 5,778,071 A * | 7/1998 | Caputo et al. | 713/159 |
| 6,076,166 A * | 6/2000 | Moshfeghi et al. | 726/4 |

(Continued)

FOREIGN PATENT DOCUMENTS

KR  10-1997-0066947  10/1997

(Continued)

OTHER PUBLICATIONS

International Search Report and Written Opinion for PCT Application No. PCT/US2008/060158, mailed Apr. 12, 2008, 3 pages.

*Primary Examiner* — Carolyn B Kosowski

(57) ABSTRACT

An authorization framework is provided that protects data records in a platform, such as a service-based platform, by requiring multiple level entities to be authorized with respect to the data records. For example, the data records can have an associated owner user that can grant access to other users with respect to the data. Additionally, however, the user can also grant access to certain applications that access the platform such that the data records can be initially closed for a user requiring the user to explicitly grant desired access to applications and/or users. In this regard, applications can be forbidden from accessing the data, even on behalf of the user, unless expressly authorized to do so by the user. Thus, the user can make informed decisions regarding who is to have access to its data.

20 Claims, 10 Drawing Sheets

U.S. PATENT DOCUMENTS

| | | | |
|---|---|---|---|
| 6,463,417 B1 * | 10/2002 | Schoenberg | 705/2 |
| 6,516,315 B1 * | 2/2003 | Gupta | 1/1 |
| 6,607,136 B1 * | 8/2003 | Atsmon et al. | 235/492 |
| 6,609,198 B1 | 8/2003 | Wood et al. | |
| 6,668,322 B1 | 12/2003 | Wood et al. | |
| 6,691,232 B1 | 2/2004 | Wood et al. | |
| 6,892,307 B1 | 5/2005 | Wood et al. | |
| 6,941,271 B1 * | 9/2005 | Soong | 705/3 |
| 6,941,313 B2 | 9/2005 | Seliger et al. | 718/108 |
| 6,944,761 B2 | 9/2005 | Wood et al. | |
| 6,988,075 B1 * | 1/2006 | Hacker | 705/3 |
| 7,062,649 B2 * | 6/2006 | Daniell et al. | 713/165 |
| 7,111,323 B1 | 9/2006 | Bhatia et al. | |
| 7,117,359 B2 | 10/2006 | Wood et al. | |
| 7,174,456 B1 | 2/2007 | Henry et al. | |
| 7,185,364 B2 | 2/2007 | Knouse et al. | |
| 7,188,181 B1 | 3/2007 | Squier et al. | |
| 7,197,568 B2 | 3/2007 | Bourne et al. | |
| 7,213,266 B1 * | 5/2007 | Maher et a | 726/26 |
| 7,234,064 B2 * | 6/2007 | Menschik et al. | 713/193 |
| 7,237,117 B2 * | 6/2007 | Weiss | 713/182 |
| 7,266,840 B2 * | 9/2007 | Gruber | 726/9 |
| 7,275,259 B2 | 9/2007 | Jamieson et al. | |
| 7,305,470 B2 | 12/2007 | Tom et al. | |
| 7,340,438 B2 * | 3/2008 | Nordman et al. | 705/64 |
| 7,380,120 B1 * | 5/2008 | Garcia | 713/160 |
| 7,392,536 B2 | 6/2008 | Jamieson et al. | |
| 7,412,720 B1 | 8/2008 | Frey et al. | |
| 7,415,607 B2 | 8/2008 | Sinn | |
| 7,421,740 B2 * | 9/2008 | Fey et al. | 726/28 |
| 7,428,637 B1 | 9/2008 | Billman et al. | |
| 7,467,414 B2 * | 12/2008 | Schlesinger | 726/27 |
| 7,478,157 B2 * | 1/2009 | Bohrer et al. | 709/226 |
| 7,506,381 B2 * | 3/2009 | Sormunen et al. | 726/30 |
| 7,526,485 B2 | 4/2009 | Hagan et al. | |
| 7,552,467 B2 * | 6/2009 | Lindsay | 726/5 |
| 7,617,541 B2 * | 11/2009 | Plotkin et al. | 726/27 |
| 7,624,424 B2 * | 11/2009 | Morita et al. | 726/1 |
| 7,657,946 B2 * | 2/2010 | Yan | 726/28 |
| 7,689,707 B2 * | 3/2010 | Chobert et al. | 709/234 |
| 7,716,240 B2 * | 5/2010 | Lim | 707/781 |
| 7,743,260 B2 * | 6/2010 | Fetik | 713/193 |
| 7,784,089 B2 | 8/2010 | Lundblade et al. | |
| 7,877,781 B2 * | 1/2011 | Lim | 726/1 |
| 7,937,749 B2 * | 5/2011 | Deishi | 726/6 |
| 7,992,198 B2 | 8/2011 | Guarraci et al. | |
| 8,185,548 B2 * | 5/2012 | Lim | 707/781 |
| 8,191,115 B2 * | 5/2012 | Minium et al. | 726/4 |
| 2001/0032100 A1 * | 10/2001 | Mahmud et al. | 705/2 |
| 2002/0133719 A1 | 9/2002 | Westerdal | |
| 2002/0169967 A1 | 11/2002 | Varma et al. | |
| 2002/0184507 A1 | 12/2002 | Makower et al. | |
| 2003/0033535 A1 | 2/2003 | Fisher et al. | |
| 2004/0064693 A1 | 4/2004 | Pabla et al. | |
| 2004/0088563 A1 * | 5/2004 | Hogan et al. | 713/200 |
| 2005/0010780 A1 | 1/2005 | Kane et al. | |
| 2005/0071677 A1 | 3/2005 | Khanna et al. | |
| 2005/0204148 A1 | 9/2005 | Mayo et al. | |
| 2006/0010011 A1 * | 1/2006 | Ullom et al. | 705/2 |
| 2006/0026042 A1 * | 2/2006 | Awaraji et al. | 705/3 |
| 2006/0182280 A1 | 8/2006 | Laitinen et al. | |
| 2006/0206932 A1 | 9/2006 | Chong | |
| 2006/0265760 A1 * | 11/2006 | Daemke et al. | 726/27 |
| 2007/0016653 A1 | 1/2007 | Larsen et al. | |
| 2007/0157297 A1 | 7/2007 | Patrick | |
| 2007/0174909 A1 * | 7/2007 | Burchett et al. | 726/18 |
| 2008/0022104 A1 * | 1/2008 | Deishi | 713/175 |
| 2008/0066150 A1 * | 3/2008 | Lim | 726/1 |
| 2008/0072300 A1 | 3/2008 | Garbow et al. | |
| 2008/0103818 A1 * | 5/2008 | Nolan et al. | 705/2 |
| 2009/0037225 A1 * | 2/2009 | Burchianti et al. | 705/3 |
| 2009/0064300 A1 | 3/2009 | Bagepalli et al. | |
| 2009/0283583 A1 * | 11/2009 | Cowburn et al. | 235/375 |
| 2009/0313049 A1 * | 12/2009 | Joao et al. | 705/3 |
| 2010/0011063 A1 * | 1/2010 | Blaiotta et al. | 709/206 |
| 2012/0102558 A1 * | 4/2012 | Muraki | 726/7 |

FOREIGN PATENT DOCUMENTS

| | | |
|---|---|---|
| WO | 2006-070045 A1 | 7/2006 |
| WO | 2006-103577 A1 | 10/2006 |

* cited by examiner

MULTIPLE ENTITY AUTHORIZATION MODEL

CROSS-REFERENCE TO RELATED APPLICATION(S)

This application claims the benefit of U.S. Provisional Patent Application Ser. No. 60/911,794 filed on Apr. 13, 2007, entitled "PLATFORM AUTHORIZATION AND AUTHENTICATION," the entirety of which is incorporated herein by reference.

BACKGROUND

The evolution of computers and networking technologies from high-cost, low performance data processing systems to low cost, high-performance communication, problem solving, and entertainment systems has provided a cost-effective and time saving means to lessen the burden of performing every day tasks such as correspondence, bill paying, shopping, budgeting information and gathering, etc. For example, a computing system interfaced to the Internet, by way of wire or wireless technology, can provide a user with a channel for nearly instantaneous access to a wealth of information from a repository of web sites and servers located around the world. Such a system, as well, allows a user to not only gather information, but also to provide information to disparate sources. As such, online data storing and management has become increasingly popular.

Financial information systems and the like provide access to sensitive data, which can be convenient for a user; however, strong security with respect to such systems is desired so the information can remain protected. To this end, developers of these systems are increasingly implementing more secure associations between users and their credentials or the platform being accessed. In an open online environment, such as the World Wide Web, packet sniffing and other communication compromising techniques are fairly simple requiring increased security methods and credentials. Many systems have started adding avatars or other verification questions/facts that a user must appropriately select or answer in addition to providing a user name and password. Additionally, tokens can be used in such systems and can comprise a plurality of data fields that are typically encrypted. The tokens, as well as the encryption/decryption algorithms, can be of increasing complexity and must be encrypted and decrypted at least at the system node. Moreover, protocols for accessing the systems are becoming more secure, requiring greater processing power which can slow access. The trends in security are moving toward the more secure association of users and platform by requiring more secure passwords, additional information beyond user name and password, better encryption algorithms for the credentials, and the like. Additionally, applications are continually being developed to utilize such platforms, and platforms are responding by being more open with respect to available methods and mechanisms for accessing such. In this regard, applications can be developed for the platform without preplanning by the platform—thus, rouge applications can become a problem in this configuration.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An authorization framework is provided for a platform configuration, such as a service-based platform for example, that facilitates authorizing on multiple levels with respect to one or more entities. In this way, data related to a user can be substantially private until the user chooses to open the data records after providing informed consent as to what certain entities are requiring/requesting. For example, an application can desire access to one or more records owned by a user; however, the user can be required to explicitly grant access to the application before access can proceed. For instance, the application can provide the platform with a minimum required record set to perform one or more functions. The user can be presented this information upon accessing the application and decide whether it wants to authorize the application. Thus, records can be protected not only on a user access basis, but also an application access basis to prevent rogue applications or applications over-extending their intended functionality.

In one embodiment, the platform can receive a request for data access from an application on behalf of a user. The data access can be to create, retrieve, update, and/or delete a record, set of records, type of record, etc., for example. The platform can initially ensure the application is registered with the platform and subsequently check the desired record for explicit application access. If the application is not authorized to access the record, the user can be prompted with a required data record set for the application to decide whether to authorize the application. If the application is authorized to access the record, the user authorization can be checked next. Since users can grant other users' access to their data, the user authorization can be checked if the user is not the owner of the data. If this succeeds, the request can be processed. It is to be appreciated that additional layers of authorization can be added as well for other entities as will be described herein.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

An authorization framework is provided to facilitate robust entity-specific securing of data in a platform. For example, considerations other than an accessing user can be taken into account when making decisions regarding authorization for data in the platform. Thus, for instance, users can select and/or specify one or more considerations that are to affect access to one or more data records belonging to the user. One such consideration can be an accessing application whether operated by a user or not. In this regard, unauthorized accessing of certain data by a rogue application (which can mimic the user context as well, for example) can be mitigated as the application can be denied access to the data on the application level. In this example, the data is secured on a multiple entity level as the correct user context is required along with an allowed application. Moreover, applications can be required to register with the platform to be considered for data access. In this way, applications can specify data required to execute one or more components of the application; the information can be provided to the user for deciding whether to grant the application access to its data.

In one embodiment, the platform can be a service-based platform comprising a plurality of accessible web methods (such as web services, for example). The platform can also house data, such as records, related to one or more users of the platform. The record data can be protected by the platform such that the owner user of the record data can grant permission to other users and applications with respect to the data. The platform can initially be in a closed position, for example, such that no application, save the application that allows the user to specify permissions, can access the data without first receiving permission from the user owner. Additionally, only the owner user can have initial access to the data in one embodiment. Subsequently, the user can open up the system as desired, providing data access to users and applications as desired making informed decisions to allow the access.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
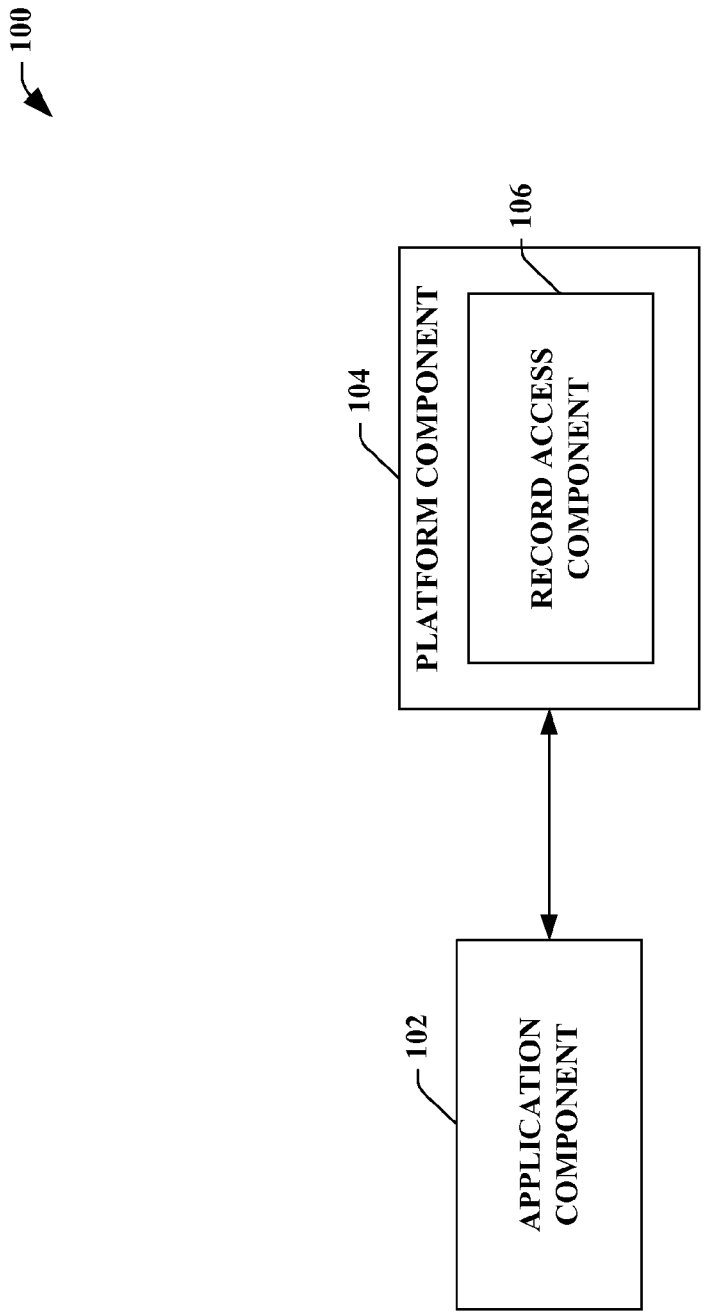
FIG. 1 illustrates a block diagram of an exemplary system that registers and application for access of authorized data in a platform.

Now turning to the figures, FIG. 1 illustrates a system 100 that facilitates registering an application with a platform for certifying data access. An application component 102 is provided that desires access to portions of data and/or methods accessible in a platform component 104. The platform component 104 comprises a record access component 106 that controls access to records in the platform component 104 as well as methods that result in accessing such records. In one embodiment, the application component 102 can register with the platform component 104 specifying one or more fields to which it requires access to function properly and/or in different modes.

In one embodiment, the platform component 104 can comprise one or more data records related to users of the platform component 104, for example. In this regard, the platform component 104 can be service-based facilitating storing, retrieving, modifying, and otherwise accessing certain data records. A record, for purposes of the subject matter described herein, can be defined as a collection of data that is tied to an entity, such as a user/individual; the entity (user/individual, for example) can have one or more associated records. The platform component 104 can house such records, which can relate to substantially any type of data. Each record, for example, can have one or more data fields or entries. For example, the data can be sensitive data, such as financial and/or health information related to one or more users, less sensitive data, such as productivity files, gaming data, etc., or many other types and/or combinations of data. Moreover, the platform component 104 can expose one or more methods to access the data, such as web methods (e.g. web services).

In one embodiment, the application component 102 can desire to provide access to the data stored in the platform component 104. For example, the application component 104 can add value to the data, such as by combining the data to create interesting views, graphs, illustrations, predictions, etc. In this regard, the application component 102 can desire access to sensitive data stored in the platform 104; however, the application component 102 can be denied access to the data with respect to the users of the platform component 104 to keep a closed secure system. To this end, the application component 102 can be required to register with the platform component 104 to gain trust by the platform component 104. Though many registration processes can be imagined, in one embodiment, the platform component 104 can request and/or receive information from the application component 102 regarding the records, types of records, set of records, etc. that the application component 102 needs access to for proper functioning. In this regard, the onus can be placed on the application component 102, or a developer thereof for example, to provide a minimum required access of the record data. It is to be appreciated that the application component 102 can desire access anonymously or on behalf of a user to data records stored in the platform component 104. Additionally, trust levels can be assigned by the platform component 104 based in part on a type and/or configuration of the application component 102, for example.

Additionally, in one embodiment, the application component 102 can operate in different modes and require access to different records, sets of records, types of records, etc. than in other modes. Moreover, the application component 102 can operate in different packages, such as disparate configurations or versions (such as basic and/or feature-rich versions according to a purchased level, for example). The disparate configurations and versions of the application component 102 can require access to different records, types of records, sets of records, and/or the like, for example. In this regard, the platform component 104 can store the requested access, such as in a mask for example, for presentation thereof to a user upon desiring to access/initialize the application component 102 or a configuration/version thereof, for example. In this regard, a user can make an informed decision regarding which applications it will allow access to based at least in part on the information the application component 102 desires. Thus, the application component 102 cannot have total control of a users data merely by being allowed by the user; rather, the application component 102 can have access only to the data the user has authorized it to, for example. The information regarding the desired access and/or allowed access can be stored in the record access component 106, for example, for subsequent use in making authorization decisions.

Figure 2:
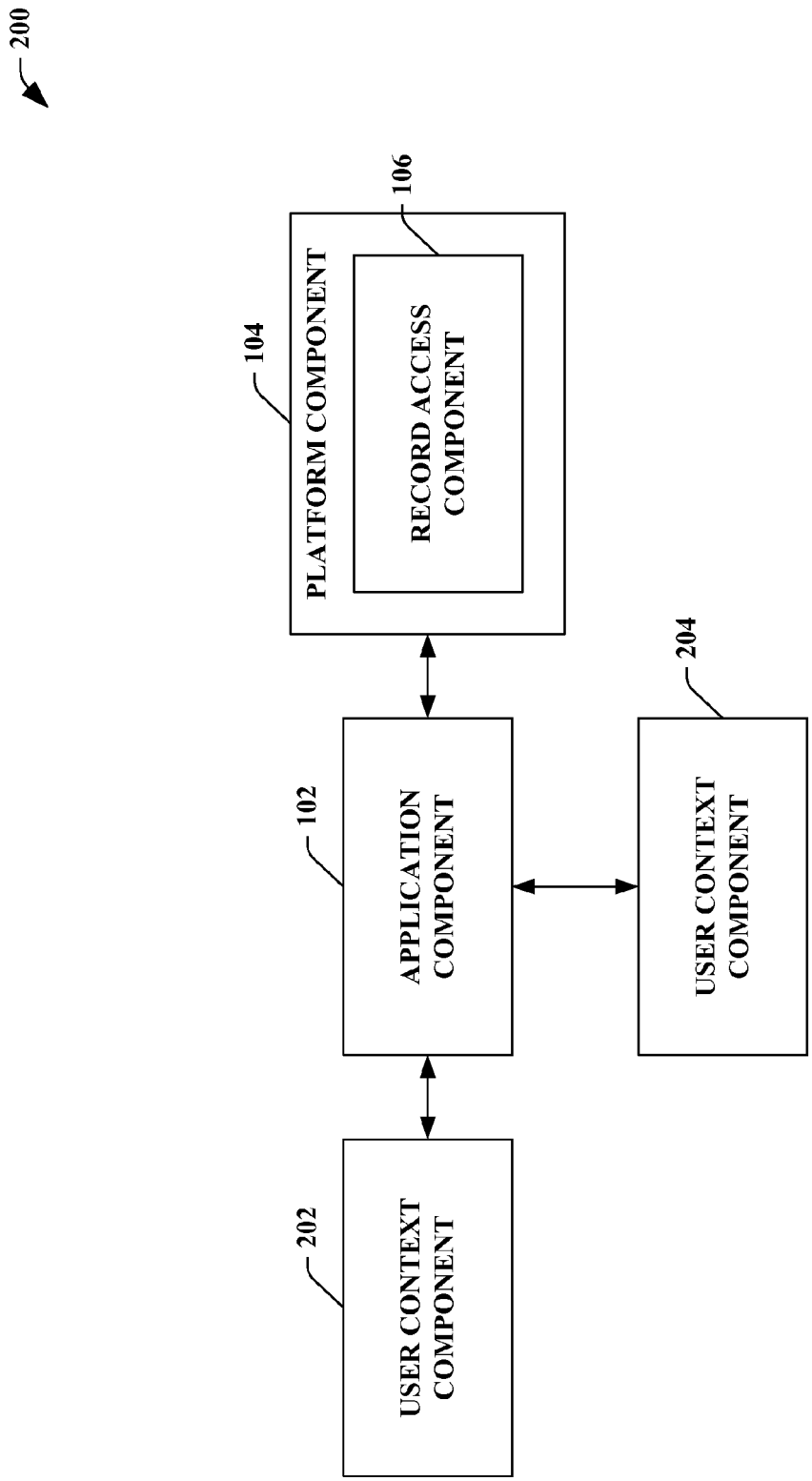
FIG. 2 illustrates a block diagram of an exemplary system that facilitates multiple user contexts accessing data records via an application.

Referring to FIG. 2, a system 200 for authorizing and utilizing an application to access platform data is shown. An application component 102 is shown that accesses data and/or methods (such as web methods) of a platform component 104. The platform component 104 comprises a record access component 106 that can store and enforce access rights with respect to given records. Additionally, two user context components 202 and 204 are provided that communicate with the same application component 102 for data stored in the platform, or a value-added representation of such, for example. It is to be appreciated that the user context components 202 and 204 can access different application components; rather, they are shown accessing the same application component 102 in this figure to facilitate discussion. In one embodiment, the application component 102 can be an application that allows users, such as the user context components 202 and 204, to specify rights and authorizations to their respective data records (e.g. data records they own) with respect to certain entities of the platform component 104 (such as applications and other users, for example). The rights and authorizations selected can be stored in the record access component 106, for example, and enforced in subsequent access requests for certain data records. It is to be appreciated that, in this embodiment the application component 102, can have automatic access to change the properties of the records related to a given user.

In another embodiment, the application component 102 can be an application that requires authorization to one or more records, record types, record sets, etc. to function properly. A user context component 202 and/or 204 can desire to utilize the application component 102 to access (e.g. store, retrieve, and/or modify) their respective data records in the platform component 104, for example. It is to be appreciated that the user context component 202 and/or 204 and the application component 102 can be required to complete an authentication process to initially determine that they are authorized to access the platform component 104 at all.

Upon an initial request for usage, the record access component 106, for example, can determine that the application component 102 is not authorized to access the required record(s) in the platform component 104 with respect to the given user context. In this embodiment, an authorization request for the application component 102 can be sent to the user context component 202 and/or 204 comprising one or more records to which the application component 102 desires access to function properly. Based in part on this information, the user context component 202 and/or 204 can choose to authorize the application component 102 or not with respect to the data record. Subsequently, the record access component 106 can enforce the desired access with respect to the record(s) and/or methods that attempt to access such record(s).

Additionally, user context components 202 and/or 204 can authorize disparate user contexts to access (store, retrieve, modify, delete, etc.) their data records. In one embodiment, the user context component 202 and/or 204 that owns the data record must still authorize applications utilized by the disparate user context(s) to access their data. Thus, in this embodiment, the application-level authorization can be more strict that a user context-level, for example. For example, in this embodiment, the user context component 202 can be the owner of a data record in the platform component 104 and can provide authorization to the user context component 204 to the data record. However, if the user context component 202 has not authorized the application component 102 to access the data record, the record access component 106 can ensure that user context component 204 cannot access the data record via application component 102, for example. Likewise, if application component 102 has been granted access to the data record by the owner user context component 202, the record access component 106 can ensure that user context component 204 cannot access the data record unless it has been explicitly authorized to do so by the owner user context component 202.

In another embodiment, the user context component 204, upon receiving permission to access the data record(s) owned by user context component 202, can still be required to authorize the application component 102 to use the record(s) as if user context component 204 owned the record(s) itself. In one embodiment, doing so simply authorizes the application component 102 to access the record belonging to user context component 202 on behalf of user context component 204; in another embodiment, doing so authorizes application component 102 to access substantially any record to which user context component 204 owns or has rights. It is to be appreciated that the record access component 106 can also implement security on a per user context per application basis as well having security options for given users for each application. Additionally, other entity layers can be added as well, which will be described infra, such as a device layer and the like. Thus, the user context component 202 and/or 204 can make informed decisions regarding which entities can receive access to their data records of the platform component 104. In one embodiment, artificial intelligence can be used to recommend applications that a user can authorize upon the user adding records, for example. Furthermore, on-line and off-line status authorizations can be selected as well; on-line can relate to a user context component 202 or 204 utilizing an application component 102 to access their data records in the platform component 104, and off-line can relate to the application component 102 accessing the records anonymously, for example. Additionally, the user context component 202 or 204 can authorize the application component 102 for single current records and/or for future records, record types, record sets, etc.

Figure 3:
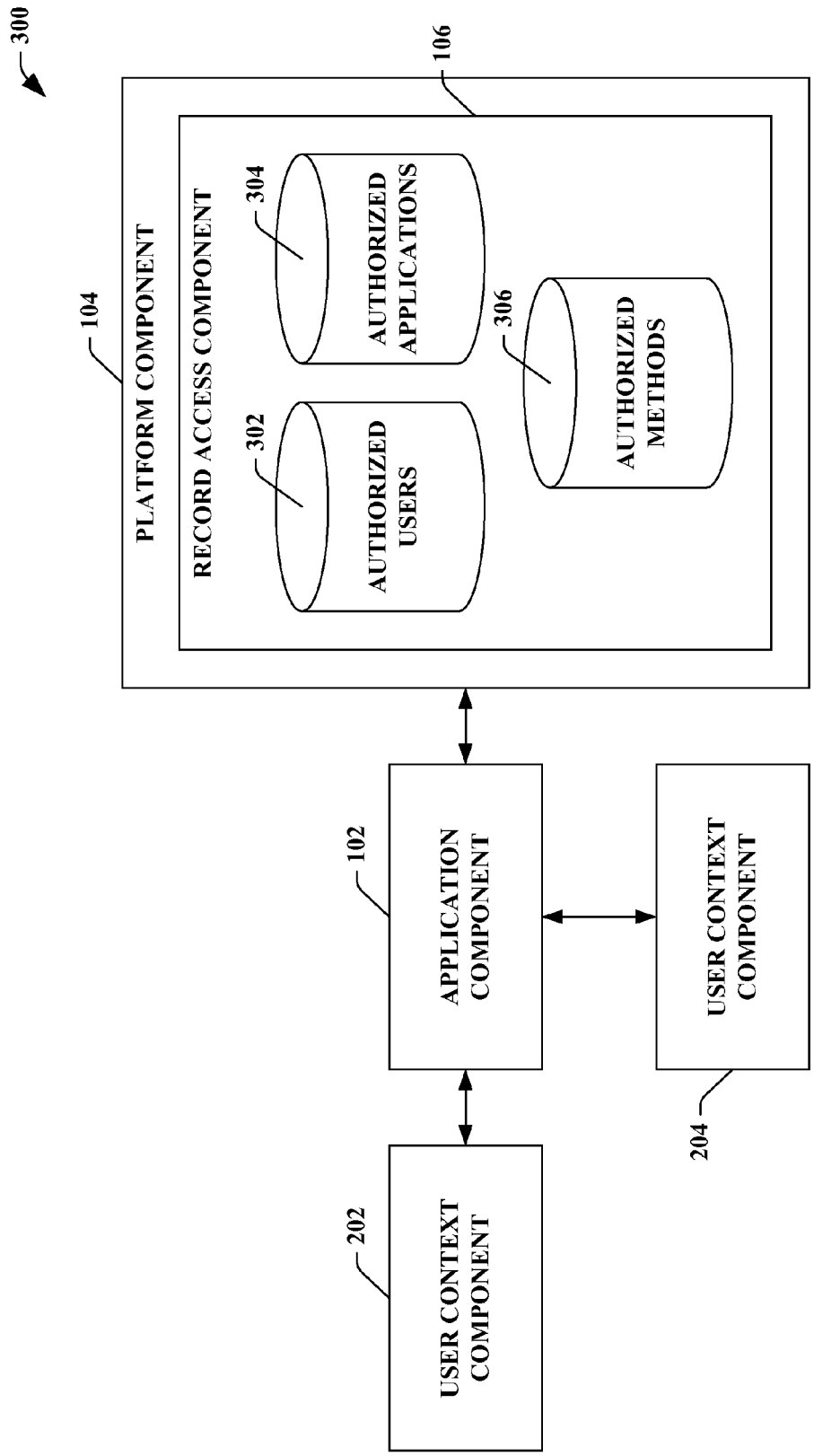
FIG. 3 illustrates a block diagram of an exemplary system that provides record data access to one or more user contexts.

Turning now to FIG. 3, a system 300 for storing and applying multiple entity authorization rules is displayed. An application component 102 is provided that accesses data and/or methods (such as web methods/services) from a platform component 104 on behalf of a user context component 202 and/or 204. The platform component 104 can secure the data by providing a record access component 106 to store and enforce authorization rules. To facilitate this end, the record access component 106 can comprise an authorized users data store 302, an authorized applications 304 data store, as well as an authorized methods data store 306 that respectively store authorization rules with respect to users, applications, and methods (such as for administration, for example). In one embodiment, a user context component 202 and/or 204 can access the application component 102 to set one or more authorization rules with respect to a user or an application; the application component 102 can communicate the desired access modification to the platform component 104 and/or the record access component 106 for storage thereof in the authorized users data store 302 and/or authorized applications data store 304. The record access component 106 can create an appropriate entry in the authorized users data store 302 and/or the authorized applications data store 304, for example. In one embodiment, the authorized methods data store 306 can be reserved for situations in which a user or group of users can imitate an owner user of a given record for custodial purposes (such as a customer service representative, administrator, and/or the like), for example.

In another embodiment, the user context components 202 and/or 204 can desire access to some data record(s) in the platform component 104 and can utilize the application component 102 to retrieve the data (and/or a value-added representation of such, for example). In this embodiment, the application component 102 can send a request for data to the platform component 104 on behalf of the user context component 202 and/or 204. Upon receiving the request, for example, the platform component 104 can leverage the record access component 106 to ensure the user context component 202 and/or 204 and application component 102 have sufficient privileges to access the desired data record (and/or a method, such as a web service, to access the data record, for example). In this regard, the record access component 106 can initially apply a global policy mask, for example. Additionally, the record access component 106 can apply permissions from the authorized users data store 302 by querying for an id of the record, for example. Moreover, the authorized applications data store 304 can be queried for the record to ensure the user/application combination is valid, for example. It is to be appreciated that the record access component 106 can take a closed approach such that if something is not in the data store, access is implicitly unauthorized. In one embodiment, the user context components 202 and/or 204 can specify other user identifiers as well, such as group memberships, which can be used in the authorization process as well. It is to be appreciated that caching techniques can be employed as well for more efficient authorization, for example.

In another embodiment, a user context component 202 and/or 204 can be a custodial context, such as a customer service representative and/or an administrator of the platform component 104, for example. The rules for authorization of these entities can be separately stored in the authorized methods data store 306, for example. In this regard, the platform component 104 can expose a plurality of methods (such as web methods or services, for example) that can be utilized for management of the platform component 104 or records stored therein, for example. In one embodiment, administrators can be a group having rights to call substantially all methods with respect to substantially all users, for example. Customer service representatives can be allowed to access methods to change contact information, for example. Thus, in these cases, the operator can impersonate a given user to access the record(s) and/or call a method that accesses the record. The authorized methods data store 306, which controls the described security scheme with respect to entities that can call given methods by impersonating a user context 202 and/or 204, can have the following schema, for example.

| | |
|---|---|
| auth_person_id | The (Guid) ID of a person or group to which the right of calling a method is being granted. |
| target_person_id | The (Guid) ID of a person or group on which the calling person can operate or impersonate. |
| method_mask_xml | An extensible markup language (XML) fragment that comprises the methods that can be called based on the IDs above. |
| date_created | An audit field specifying the date the entry was created in the table. |
| date_updated | An audit field specifying the date the entry was last updated in the table. |

It is to be appreciated that applications can be regulated on a per method per user basis and/or a per method per user per application basis as well.

Figure 4:
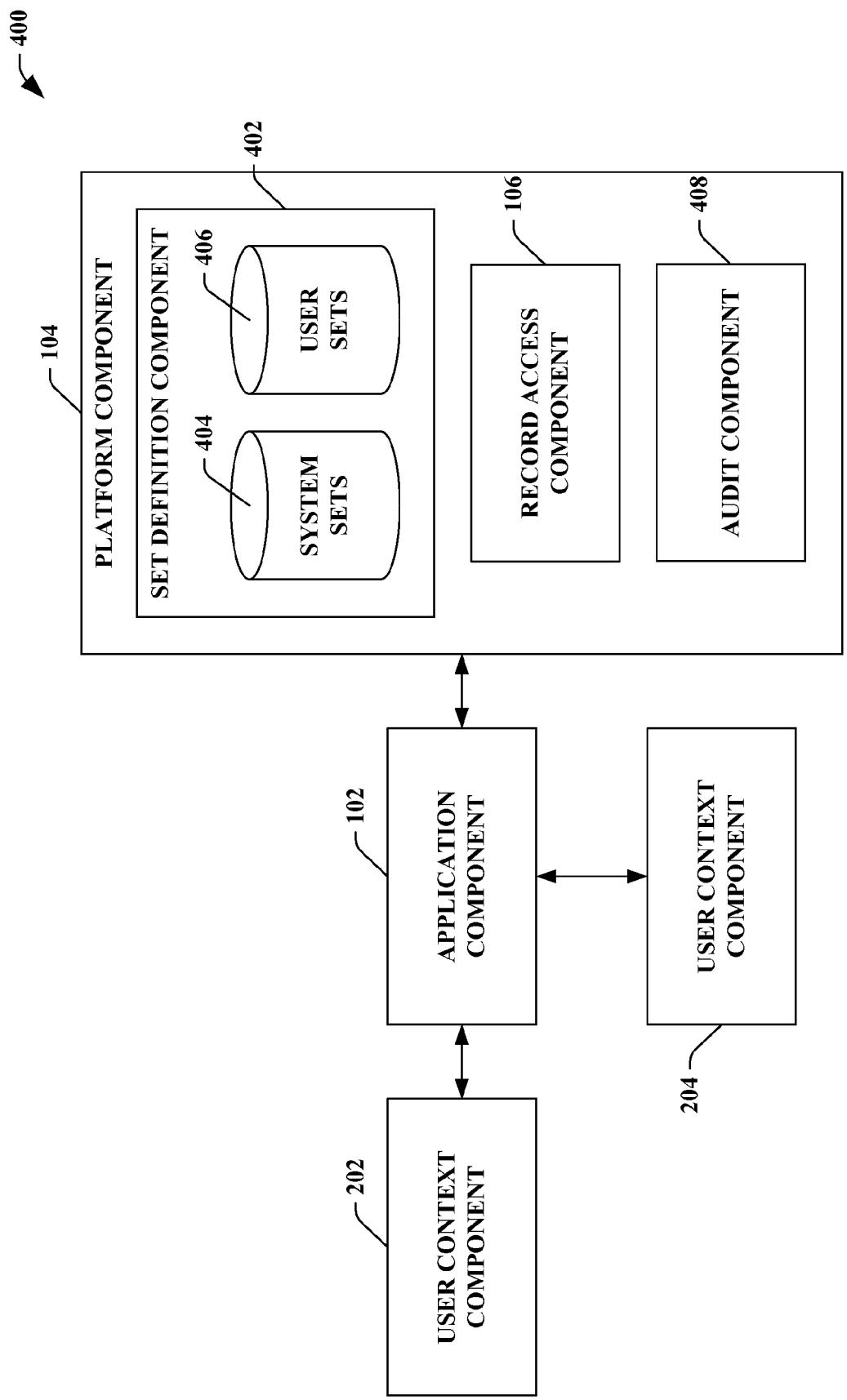
FIG. 4 illustrates a block diagram of an exemplary system that facilitates using set functionality in providing authorized access to data records in a platform.

Referring now to FIG. 4, a system 400 that facilitates using record set functionality in providing authorization for one or more records (or sets) is shown. An application component 102 is provided to access data records in a platform component 104 on behalf of one or more user context components 202 and/or 204. The platform component 104 can comprise a record access component 106 that controls access to one or more records stored in the platform component 104 (and/or one or more exposed methods that provide access to the one or more records, for example). Additionally, the platform component 104 can comprise a set definition component 402 that can group records (or elements/fields of a record) into virtual sets; the set definition component 402 can comprise a system sets data store 404 and a user sets 406 data store that can respectively store set information for sets created by the system and by a given user. Also, the platform component 104 can comprise an audit component 408 that can log activity on the platform component 104 with respect to records, sets, and/or authorization modifications to both (such as in the record access component 106), for example.

In one embodiment, sets can be defined to logically group one or more records and/or elements/fields of one or more records. In this regard, authorization can be controlled for an entire set as well as other management activities to ease handling of the records. In one embodiment, system sets can be created in the system sets data store 404 for maintenance and management of records from a platform standpoint. For example, the platform component 104 can store and provide access to health information for one or more users, and system sets can be defined in the system set data store 404 for groupings of private health data, such as mental health records, AIDS/HIV health records, substance abuse health records, genetic tests, and the like. To this end, system sets can override authorizations set by a user context component 202 and/or 204, for example, to meet requirements of the platform component 104 and/or governing bodies enforcing such requirements (such as real-world standards, like the Health Information Portability and Accountability Act (HIPAA), for example). Thus, for given user health records, for example, HIPAA can govern that certain records be kept private or that only certain individuals (such as physicians, for example) be given access to the records to keep the platform component 104 in line with HIPAA requirements, for example. The record access component 106 can enforce authorization with respect to the sets by additionally utilizing the set definition component 402, for example. It is to be appreciated that the system sets can provide benefit for other types of platforms as well, such as financial or substantially any type of data platform. It is to be appreciated as well that other system sets can be defined—not just those for authorization override. For example, sets can be defined for given date ranges, as related to one or more types of data in the platform component 104 (such as data types where the data types can be controlled or enforced by one or more schemas, for example), as other values for certain fields are satisfied, etc. In one example, data can be grouped in a set by data type, such as health data in one set, fitness data in another, vital health data in a set, and the like. One or more sets can have similar fields as well to allow for many combinations of data to facilitate sensible grouping of the data. Additionally, by using date ranges and types to define a set, a set can be created for monthly exercise metrics, for example.

In addition, the user sets data store 406 can define one or more sets related to the records as desired by a user. For example, a user context component 202 and/or 204 can access an application component 102 to define one or more sets comprising one or more records and/or fields of records, for example. The application component 102 can forward the request to the platform component 104, which can utilize the set definition manager 402 to define the sets. Once defined, the user context component 202 and/or 204 can manage the sets (and authorization thereto, for example) to ease the burden of defining security for each record at each level. It is to be appreciated that granting access to a set does not necessarily grant access to the individual records in the set (or other combinations thereof), for example. Sets can be authorized in substantially the same manner as records (shown supra) with respect to applications and user contexts, for example. Additionally, applications, such as application component 102, can define sets for required data to perform certain functions, for example, and request access to the set upon a user context component 202 and/or 204 requesting to use the application component 102.

In one embodiment, the audit component 408 can create an audit trail for changes made to records and/or authorizations thereto (such as by the record access component 106, for example) as well as changes to sets by the set definition component 402. In this regard, changes can be rolled back where they are later deemed undesired. Additionally, the audit component 408 can serve as a logging mechanism that can be queried to determine when changes are made to the records and/or sets (and/or authorizations thereto), who made the changes, and what changes were made, for example.

Figure 5:
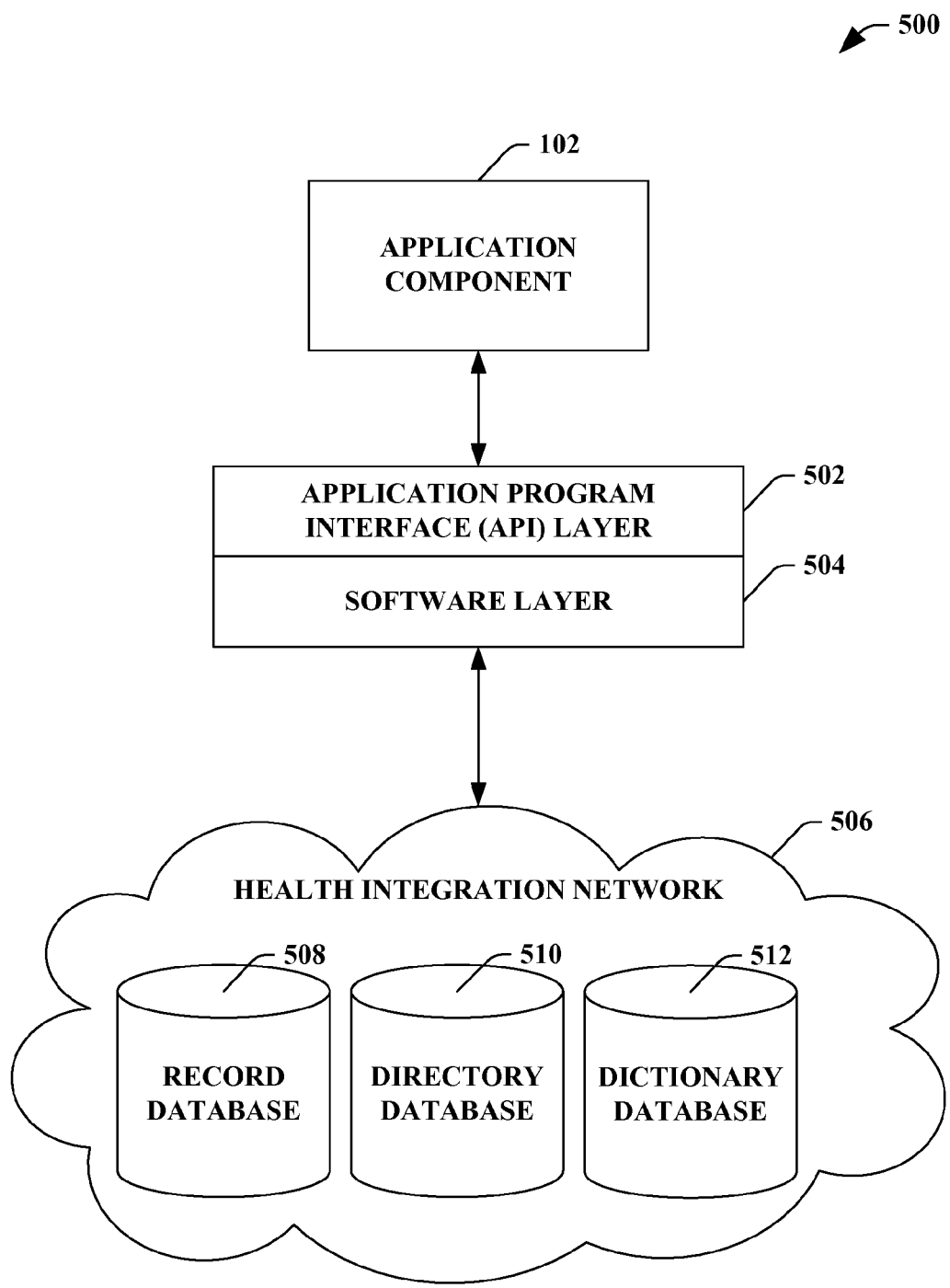
FIG. 5 illustrates a block diagram of an exemplary system that facilitates accessing record data from components of a health integration network.

Referring to FIG. 5, an example system 500 that facilitates accessing information within a health integration network is shown. As described above, one possible platform implementation is for health-related data, which can be managed in the network provided in this figure. An application component 102 can at least one of display or specify health related data. It is to be appreciated that the application component 102 can be many different types of applications including software applications, electronic devices executing a software application, electronic devices alone, legacy devices interfaceable with a device executing a software application, and the like. The application can operate in a user context and can utilize an application program interface (API) 502 to request and store data within a health integration network 506. It is to be appreciated that the API 502 can synchronously or asynchronously communicate with a plurality of application components 102 of similar or different types. The API 502 can also have a software layer 504 to leverage in interpreting and processing the request. The software layer 504 can be separated out as shown, or it can be integrated within the API 502, the health integration network 506, or both. Upon interpreting and processing a request from the application component 102, the software layer 504 can access the health integration network 506 for any necessary data or to store necessary data to fulfill the request. The software layer 504 can also provide value-add to the data such as assembling data from the health integration network 506, applying business models or processes in conjunction with data, caching data, and/or applying transformations or additional information to/with the data. It is to be appreciated that there may be a plurality of APIs 502 and software layers 504 connecting to a centralized health integration network 506, and the centralized health integration network 506 may be a single system or distributed across multiple systems, platforms, and the like.

The health integration network 506 can comprise a plurality of data stores including a record database 508, a directory database 510, and a dictionary database 512. In addition, the health integration network 506 can comprise many other systems and/or layers to facilitate data management and transfer. Furthermore, the databases can be redundant such that multiple versions of each database are available for other APIs and applications and/or a back-up source for other versions of the databases. Additionally, the databases can be logically partitioned among various physical data stores to allow efficient access for highly accessed systems. Moreover, the databases can be hierarchically based, such as XML and/or relationally based. The record database 508 can be highly distributed and comprise personal health related data records for a plurality of users. The records can be of different formats and can comprise any kind of data (single instance, structured or unstructured), such as plain data, data and associated type information, self-describing data (by way of associated schemas, such as XSL schemas for example), data with associated templates (by way of stylesheets for example), data with units (such as data with conversion instructions, binary data (such as pictures, x-rays, etc.), and the like. Moreover, the record database 508 can keep an audit trail of changes made to the records for tracking and restoration purposes. Additionally, any data type or related instances of the foregoing information can be stored in a disparate database such as the dictionary database 512 described infra. The record database 508 can be partitioned, distributed, and/or segmented based on a number of factors including performance, logical grouping of users (e.g. users of the same company, family, and the like).

The directory database 510 can store information such as user account data, which can include user name, authentication credentials, the existence of records for the user, etc. The directory database 510 can also house information about records themselves including the user to whom they belong, where the record is held (in a distributed record database 508 configuration) authorization rules for the records, etc. For example, a user can specify that a spouse have access to his/her fitness related data, but not medical health related data. In this way, a user can protect his/her data while allowing appropriate parties (such as spouse, doctor, insurance company, personal trainer, etc.) or applications/devices (blood pressure machine, pacemaker, fitness watch, etc.) to have access to relevant data. In addition, the directory database 510 can comprise data regarding configuring application components 102 to interact with the health integration network 506; application components 102 can be required to register with the health integration network 506, and thus, the application data in the directory database 510 can include the registration information.

The dictionary database 512 can hold information relating to vocabulary definitions used by the health integration network 506 and requesting entities such as the API 502 and software layer 504. Such definitions can include data type definitions and information on how to display the different data types or transform them. Additionally, the dictionary database 512 can hold information for display layouts and templates, etc. Furthermore, the dictionary database 512 can hold different look-up tables that define codes through the use of standards and the like. For example, the dictionary database 512 can support International Classification of Diseases, ninth revision (ICD-9) released by the National Center for Health Statistics. These codes identify different diseases and diagnoses; thus a doctor can put one of these codes on a user's chart in the health integration network 506, and the dictionary database 512 can allow the software layer 504 (or API 502) to translate this code into something that makes more sense to the user, such as medical name and/or different, other, or additional information concerning the diagnosis. The dictionary database 512 can also be used to retrieve other metadata such as plural and abbreviated forms of codes (such as ICD-9 codes). It can also hold information that allows conversion between different measurement units, such as between feet to meters, Fahrenheit to Celsius, pounds to kilograms, etc.

In one embodiment, the application component 102, which can be more than one application, can make a call to the API 502 to request, store, or modify data, for example. The API 502 leverages the software layer 504 to process the call made by the application component 102. The software layer 504 can then query its own internal cache or the health integration network 506 for desired data; additionally or alternatively, the software layer 504 can directly query one or a plurality of the databases 508, 510, and 512 for the desired data. The health integration network 506 can provide an authorization scheme similar to that disclosed herein and ensure the application component 102 and/or a user context thereof is authorized to receive the requested data. The software layer 504 can serially or asynchronously query for data until all data is obtained from the health integration network 506. The software layer 504 can then manipulate portions of the data using other data it has obtained to formulate the result desired by the application component 102 and return that result to the application component 102 via the API 502. For example, an application component 102 can request a user's blood pressure reading by calling the API 502, which in turn can communicate with the software layer 504 to formulate the desired reading. The software layer 504 can query, directly or through the health integration network 506, the directory database 510 to obtain the location of the blood pressure reading, the dictionary database 512 to obtain schema, style, and general type information for blood pressure types, and the record database 508 to obtain the actual reading. Querying the record database, for example, can require authorization of the application component 102 and/or a user context provided by the application component 102 before returning the data. Using the schema, the software layer 504 can interpret the record as two integers representing a systolic and diastolic pressure (and perhaps a pulse rate), and return these numbers to the application component 102 through the API 502, or also apply a style, units, or other template to the numbers and return the result whether it be a string, XML, HTML, a picture, or the like. Additionally, the software layer 504 can return the raw data along with the transformation, style, and/or schema information to the application component 102 through the API 502 to allow the application component 102 to apply the these at will. Also, the software layer 504 can store the result in cache memory for future access. It is to be appreciated that the subject matter described is not so limited to the foregoing example/embodiment, but rather this is one of many possible embodiments of an authorization scheme and platform.

Figure 6:
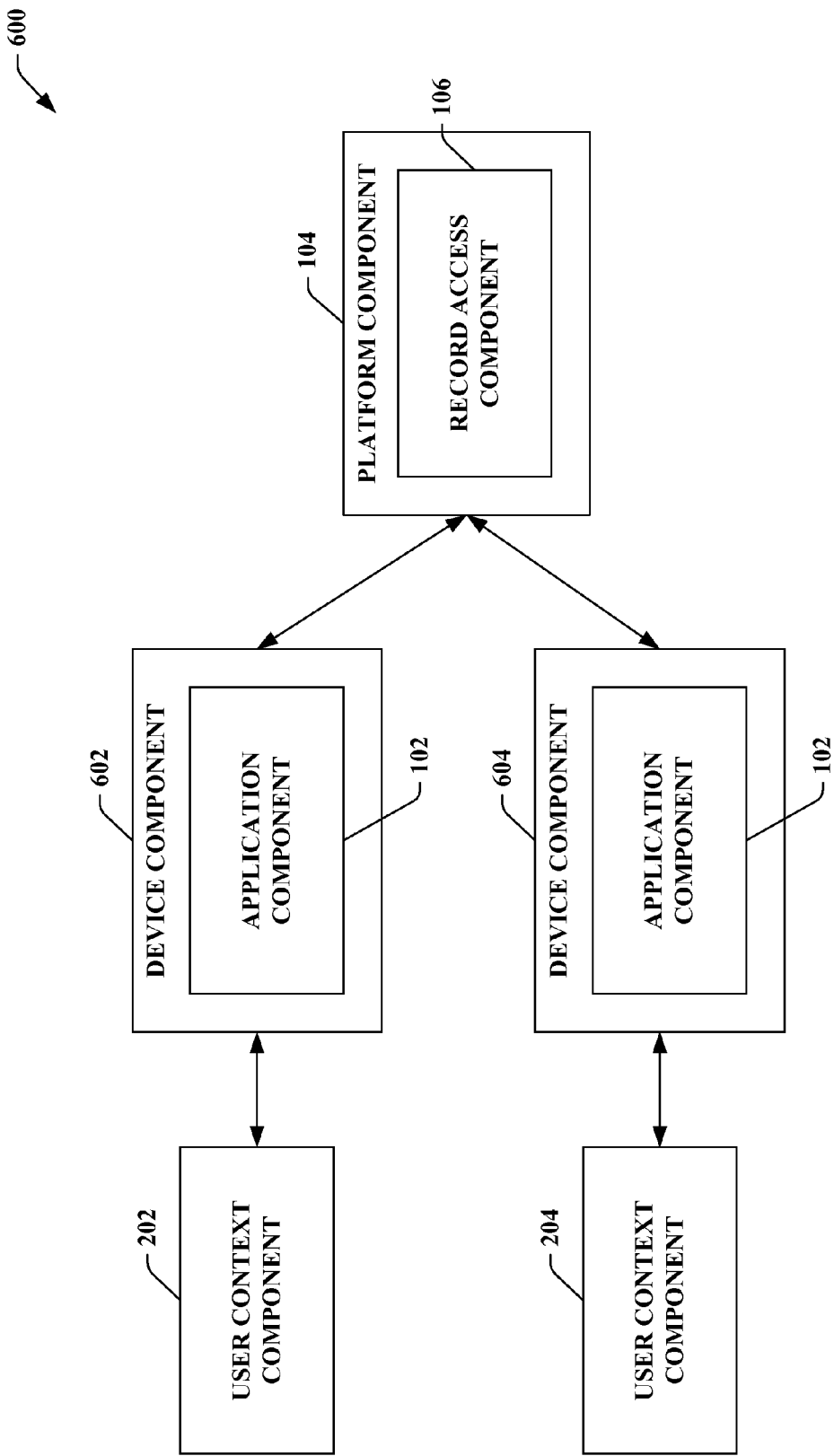
FIG. 6 illustrates a block diagram of an exemplary system that facilitates multiple entity authorization on device, application, and user levels.

Now referring to FIG. 6, a system 600 is displayed that facilitates multiple entity authorization for accessing data in a platform. Application components 102 are provided for accessing data in a platform component 104 on behalf of one or more device components 602 and/or 604. The device components can execute an application component 102 (which can be the same or different for each device component 602/604). The platform component 104 can comprise a record access component 106 that controls access to one or more records in the platform component 104 (and/or exposed methods that return record data, for example) based on multiple entity authorization. In one embodiment, the user context components 202 and 204 leverage the respective device components 602 and 604 to access (retrieve, store, modify, delete, or otherwise, for example) records in the platform component 104. The device components 602 and 604 can utilize their respective application components 102 to gain the desired access, and the record access component 106 can regulate access to the records.

In one embodiment, the record access component 106 can store additional entity levels for authorization purposes. For example, records can be protected on a per user per application per device basis. In this regard, the authorization scheme can scale to many different types and numbers of entities. In this embodiment, a user context component 202 and/or 204 can be required to authorize a device component 602/604 and an application component 102 to access data owned by the user context component 202/204. Thus, similarly to the application component 102, the device component 602/604 can register with the platform component 104 and the record access component 106 specifying records, record types, record fields, record sets, and/or the like to which it needs access for proper functioning. Additionally, the application component 102 operated by the device component 602/604 can be required to do the same.

In another embodiment, the application component 102 can provide access to records in the platform component 104 owned by the user context component 202. Authorization permission can be explicitly required for the application component 102 and the device component 602, for example. The permission request can be presented to the user context component 202, as described supra, such that an informed decision is made regarding the authorization decision. The user context component 202 can also authorize the user context component 204 to access the data; however, the user context component 204 can be required to authorize application component 102 and device component 604 to access the data. If, for example, the user context component 202 had authorized application component 102 and device component 602 to access the data, it still can be required to explicitly authorize device component 604 to access the data if it wishes to utilize device component 604, for example. In this regard, even though application component 102 has been granted access, the device components 602/604 can separately require access granting as well. Thus, multiple entity authorization can span beyond the user/application/record triangle.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent, for instance by inferring actions based on contextual information. By way of example and not limitation, such mechanism can be employed with respect to generation of materialized views and the like.

Figure 7:
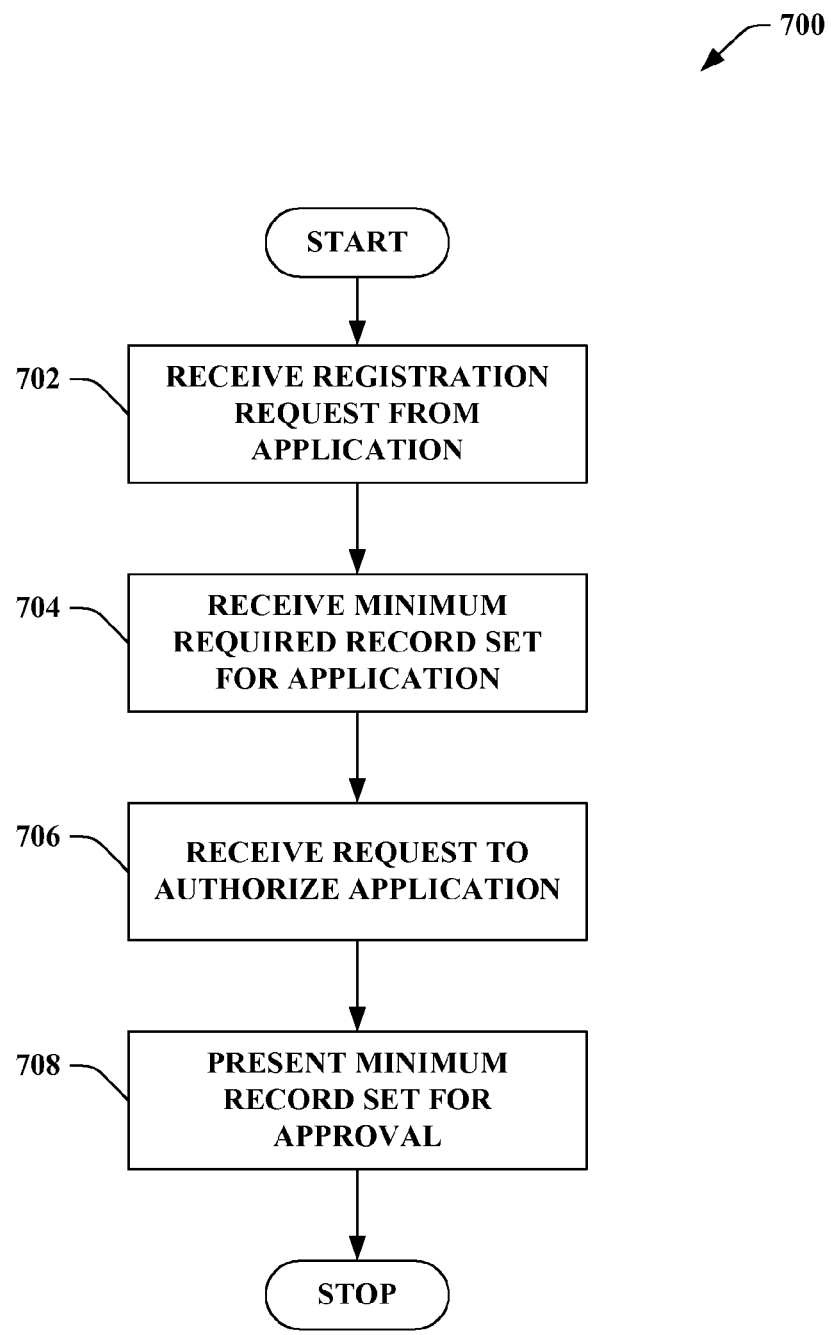
FIG. 7 illustrates an exemplary flow chart for registering an application and requesting authorization for the application.
Figure 8:
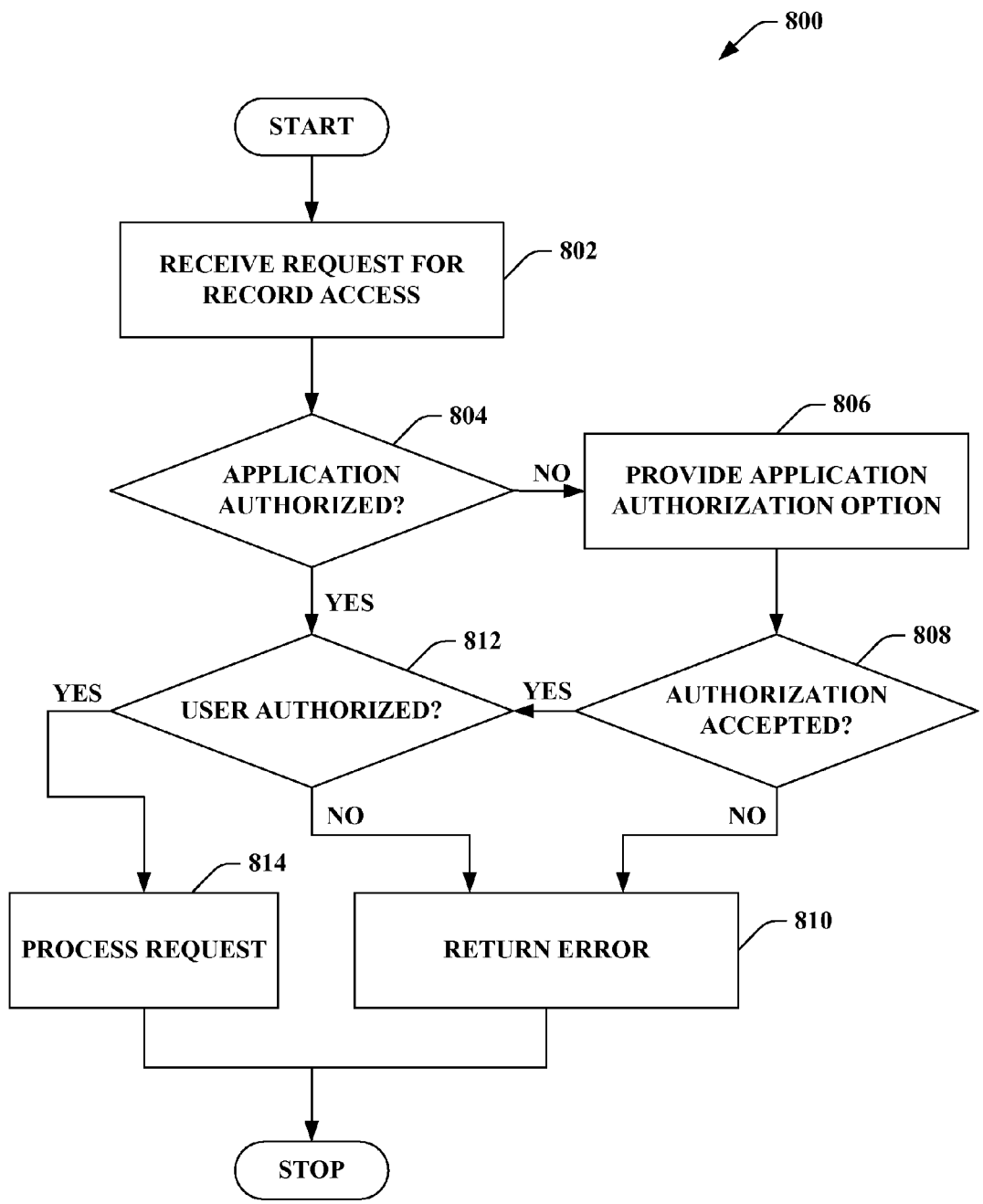
FIG. 8 illustrates an exemplary flow chart for responding to a request for accessing authorized data.

In view of the exemplary systems described supra, methodologies that may be implemented in accordance with the disclosed subject matter will be better appreciated with reference to the flow charts of FIGS. 7-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a methodology 700 that facilitates registering an application and subsequently processing a request to authorize the application. As mentioned, this can occur in a platform scenario where the platform stores data records and controls access thereto. Access can be controlled based not only on user accounts but also per application. At 702, a registration request is received from an application. The application can be required to register with the platform before it can access the data records stored in the platform. The application can be substantially any application that can communicate with the platform by calling methods exposed by the platform for data access. The registration request can provide some information regarding the application such as an identifier, name, developer contact information, and the like. At 704, a minimum required record set is received for the application as well. This can comprise the records the application must have access to for proper functioning. It is to be appreciated, as described supra, that this can be with respect to modes, versions, configurations, etc. of the application, for example. The minimum record set requirements can be stored at the platform for subsequent use. It is to be appreciated that communication can occur between the platform and application as well to validate the set requirements; for example, the platform can deny access to certain records based on a type or configuration of the application (thick-client vs. application server, for example).

At 706, a request is received to authorize the application, such as with respect to a data record. For example, this can come from a user context and/or an application requesting data records on behalf of a user context. The user context can be the owner of the data record or otherwise have some access to the data record, for example, and can desire to authorize the application to utilize the data. This can take place, for example, when a user uses the application for the first time. At 708, the minimum record set required by the application can be presented (such as to the user). Using this, the entity to whom the information is presented can make an informed decision regarding whether to allow the application access to the record set. As described, the application can have multiple modes and the modes can each be presented with their required record sets. Using this data, the entity can select a mode as well, for example.

FIG. 8 shows a methodology 800 for authorizing a request made to a platform for accessing record data. At 802, a request for record access is received. The request, for example, can be received by an application operating on behalf of a user context. The record can be part of a platform that stores and manages access to one or more records owned by a user context, for example. The platform can require both user and application authorization as described herein. At 804, the application is checked for authorization. It is to be appreciated that the user context can be required to authorize the application to access its record(s) before the application is truly authorized. To this end, if the application is not authorized, the option to authorize the application can be provided at 806. The option can comprise the minimum record set required by the application for proper functioning, for example.

At 808, the option can be checked for acceptance by an entity, such as the user context. If the authorization is not accepted, an error can be returned at 810. If the authorization for the application is accepted, the user authorization is checked at 812. Had the application already been authorized at step 804, the user authorization can have been checked at 812. This step determines if the user is authorized to access the data record in the manner requested. It is to be appreciated that a user context can likely access records it creates in substantially any manner available. However, user contexts can receive access to other users' records and this access is checked at 812. If the user is not authorized, an error can be returned at 810. If the user is authorized, the request for the data record can be further processed at 814.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 9:
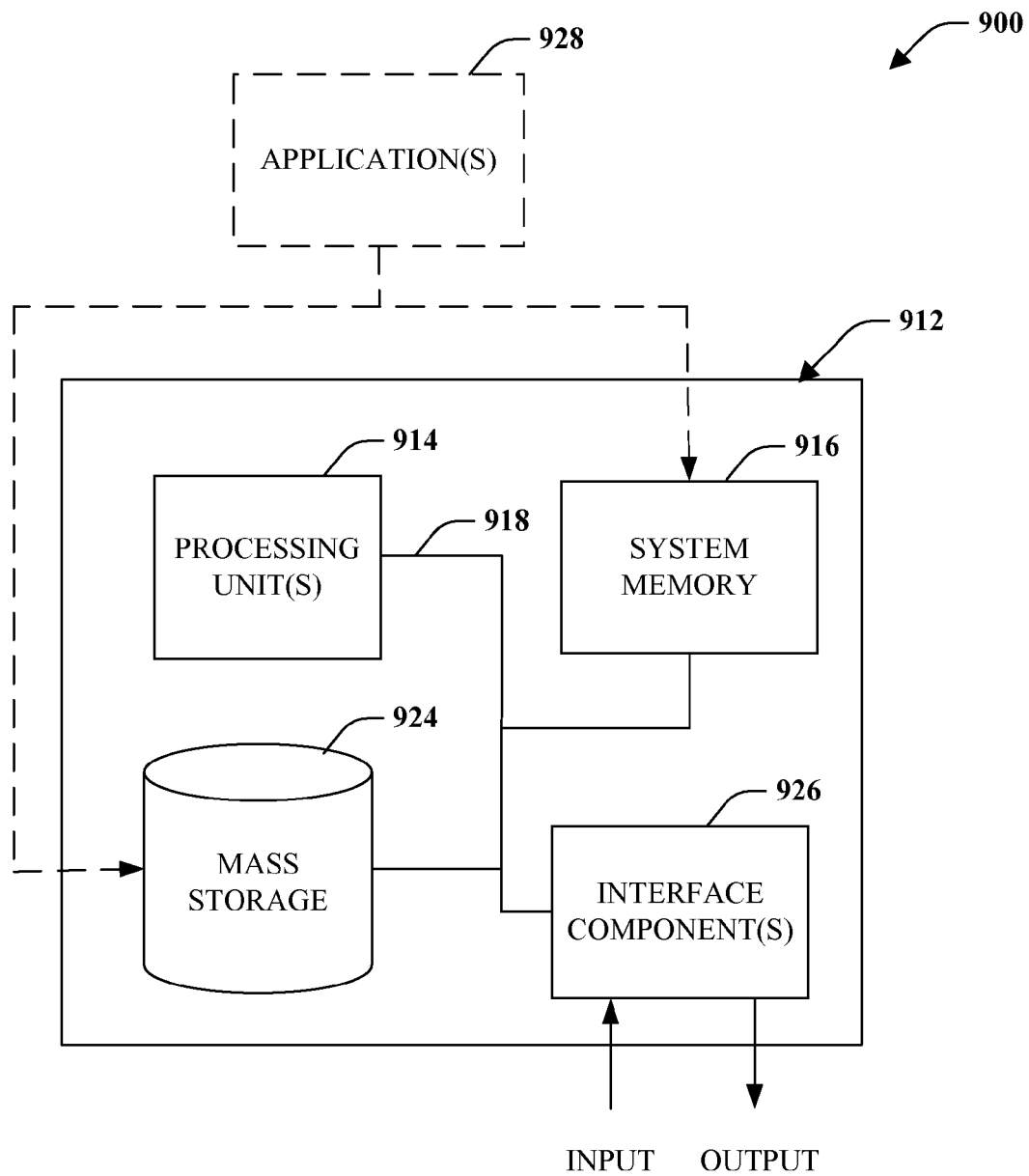
FIG. 9 is a schematic block diagram illustrating a suitable operating environment.
Figure 10:
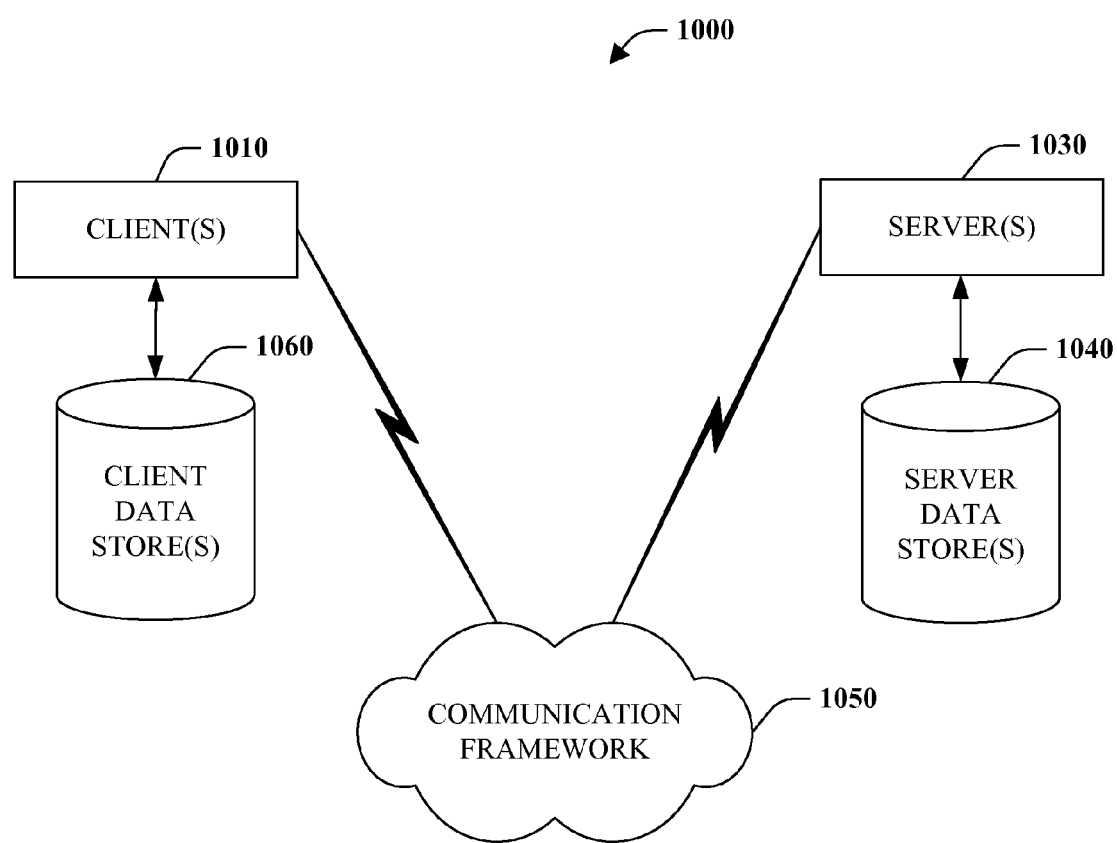
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 9, an exemplary environment 900 for implementing various aspects disclosed herein includes a computer 912 (e.g., desktop, laptop, server, hand held, programmable consumer or industrial electronics . . . ). The computer 912 includes a processing unit 914, a system memory 916 and a system bus 918. The system bus 918 couples system components including, but not limited to, the system memory 916 to the processing unit 914. The processing unit 914 can be any of various available microprocessors. It is to be appreciated that dual microprocessors, multi-core and other multiprocessor architectures can be employed as the processing unit 914.

The system memory 916 includes volatile and nonvolatile memory. The basic input/output system (BIOS), containing the basic routines to transfer information between elements within the computer 912, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 912 also includes removable/non-removable, volatile/non-volatile computer storage media. FIG. 9 illustrates, for example, mass storage 924. Mass storage 924 includes, but is not limited to, devices like a magnetic or optical disk drive, floppy disk drive, flash memory or memory stick. In addition, mass storage 924 can include storage media separately or in combination with other storage media.

FIG. 9 provides software application(s) 928 that act as an intermediary between users and/or other computers and the basic computer resources described in suitable operating environment 900. Such software application(s) 928 include one or both of system and application software. System software can include an operating system, which can be stored on mass storage 924, that acts to control and allocate resources of the computer system 912. Application software takes advantage of the management of resources by system software through program modules and data stored on either or both of system memory 916 and mass storage 924.

The computer 912 also includes one or more interface components 926 that are communicatively coupled to the bus 918 and facilitate interaction with the computer 912. By way of example, the interface component 926 can be a port (e.g., serial, parallel, PCMCIA, USB, FireWire . . . ) or an interface card (e.g., sound, video, network . . . ) or the like. The interface component 926 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 912 to output device(s) via interface component 926. Output devices can include displays (e.g., CRT, LCD, plasma . . . ), speakers, printers and other computers, among other things.

FIG. 10 is a schematic block diagram of a sample-computing environment 1000 with which the subject innovation can interact. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing the aspects of the subject innovation, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. Here, the client(s) 1010 can correspond to program application components and the server(s) 1030 can provide the functionality of the interface and optionally the storage system, as previously described. The client(s) 1010 are operatively connected to one or more client data store(s) 1060 that can be employed to store information local to the client(s) 1010. Similarly, the server(s) 1030 are operatively connected to one or more server data store(s) 1040 that can be employed to store information local to the servers 1030.

By way of example, one or more client(s) 1010 can desire access to one or more server(s) 1030 and/or one or more data records stored in the server data store(s) 1040. The request can be made on behalf of a user context from the client(s) 1010 and sent across the communication framework 1050 to the one or more server(s) 1030. The server(s) can determine if the client(s) 1010 and associated user contexts are authorized to access the requested data. If so, the data can be retrieved from the server data store(s) 1040 and transmitted back across the communication framework 1050 to the client(s) 1010. In one embodiment, the client(s) 1010 can store the requested data in its local client data store(s) 1060.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer-implemented method of securing data records in a service-based web platform, the computer-implemented method comprising:
   storing, by the service-based web platform, one or more data records associated with an owner entity that is authorized to access the service-based web platform and the one or more data records;

exposing, by the service-based web platform, web methods for accessing data records stored by the service-based web platform, wherein authorization to call certain web methods is granted by the service-based web platform to authorized users of the service-based web platform according to user context;

receiving, by the service-based web platform, a call to an exposed web method from an application requesting access to a stored data record associated with the owner entity on behalf of a user;

verifying, by the service-based web platform, authorization of the application to call the exposed web method based at least on whether the user is authorized to access the service-based web platform and has been granted authorization to call the exposed web method by the service-based web platform; and denying, by the service-based web platform, access of the application to the stored data record associated with the owner entity upon verifying authorization of the application to call the exposed web method unless:

the user is at least one of the owner entity or a user that has been explicitly granted access by the owner entity to the stored data record or a set of data records that includes the stored data record;

the application is registered with the service-based web platform;

the owner entity has explicitly granted the application access to a minimum required data record set that was specified by the application during registration; and the stored data record is within the minimum required data record set.

2. The computer-implemented method of claim 1, further comprising:
receiving, by the service-based web platform, a registration request and the minimum required data record set from the application.

3. The computer-implemented method of claim 1, wherein the minimum required data record set is specified for proper functioning of the application.

4. The computer-implemented method of claim 3, wherein the minimum required data record set is defined by a developer of the application.

5. The computer-implemented method of claim 1, further comprising:
presenting, by the service-based web platform, the minimum required data record set to the owner entity; and
obtaining, by the service-based web platform, consent from the owner entity to authorize the application to access the minimum required data record set.

6. The computer-implemented method of claim 1, further comprising:
creating, by the service-based web platform, one or more sets of data records associated with the owner entity; and
storing, by the service-based web platform, authorization rules desired by the owner entity for the one or more sets of data records as a whole.

7. The computer-implemented method of claim 6, further comprising:
superseding, by the service-based web platform, the authorization rules desired by the owner entity for the one or more sets of data records with system set authorization rules for individual data records in the one or more sets of data records that contain sensitive data.

8. The computer-implemented method of claim 7, further comprising:
restricting, by the service-based web platform, access to the stored data record according to the system set authorization rules if the stored data record contains sensitive data, wherein the system set authorization rules satisfy a standard that governs access to the sensitive data contained in the stored data record.

9. The computer-implemented method of claim 1, further comprising:
verifying, by the service-based web platform, authorization of a device utilizing the application to request access to the stored data record associated with the owner entity, wherein the service-based web platform further denies access of the application to the stored data record associated with the owner entity unless the owner entity has explicitly granted access to the device.

10. A computer-readable storage medium that does not consist of a signal, the computer-readable storage medium having instructions stored thereon that, when executed by a computing device, cause the computing device to perform operations comprising:

storing, by a service-based web platform, one or more data records associated with an owner entity that is authorized to access the service based web platform and the one or more data records;

exposing, by the service-based web platform, web methods for accessing data records stored by the service-based web platform, wherein authorization to call certain web methods is granted by the service-based web platform to authorized users of the service-based web platform according to user context;

receiving, by the service-based web platform, a call to an exposed web method from an application requesting access to a stored data record associated with the owner entity on behalf of a user;

verifying, by the service-based web platform, authorization of the application to call the exposed web method based at least on whether the user is authorized to access the service-based web platform and has been granted authorization to call the exposed web method by the service-based web platform; and denying, by the service-based web platform, access of the application to the stored data record associated with owner entity upon verifying authorization of the application to call the exposed web method unless:

the user is at least one of the owner entity or a user that has been explicitly granted access by the owner entity to the stored data record or a set of data records that includes the stored data record;

the application is registered with the service-based web platform;

the owner entity has explicitly granted the application access to a minimum required data record set that was specified by the application during registration; and the stored data record is within the minimum required data record set.

11. The computer-readable storage medium of claim 10, wherein the operations further comprise:
registering, by the service-based web platform, the application in response to receiving a registration request and the minimum required data record set from the application;

presenting, by the service-based web platform, the minimum required data record set to the owner entity; and obtaining, by the service-based web platform, consent from the owner entity to authorize the application to access the minimum required data record set.

12. The computer-readable storage medium of claim 10, wherein the minimum required data record set is defined by a developer of the application for proper functioning of the application.

13. The computer-readable storage medium of claim 10, wherein the operations further comprise:
creating, by the service-based web platform, one or more sets of data records associated with the owner entity; and
storing, by the service-based web platform, authorization rules desired by the owner entity for the one or more sets of data records as a whole.

14. The computer-readable storage medium of claim 13, wherein the operations further comprise:
superseding, by the service-based web platform, the authorization rules desired by the owner entity for the one or more sets of data records with system set authorization rules for individual data records in the one or more sets of data records that contain sensitive data; and
restricting, by the service-based web platform, access to the stored data record according to the system set authorization rules if the stored data record contains sensitive data, wherein the system set authorization rules satisfy a standard that governs access to the sensitive data contained in the stored data record.

15. The computer-readable storage medium of claim 10, wherein the operations further comprise:
verifying, by the service-based web platform, authorization of a device utilizing the application to request access to the stored data record associated with the owner entity, wherein the service-based web platform further denies access of the application to the stored data record associated with the owner entity unless the owner entity has explicitly granted access to the device.

16. A computer system comprising:
a processor configured to execute computer-executable instructions; and
memory storing computer-executable instructions for:
storing, by a service-based web platform, one or more data records associated with an owner entity that is authorized to access the service-based web platform and the one or more data records;
exposing, by the service-based web platform, web methods for accessing data records stored by the service-based web platform, wherein authorization to call certain web methods is granted by the service-based web platform to authorized users of the service-based web platform according to user context;
receiving, by the service-based web platform, a call to an exposed web method from an application requesting access to a stored data record associated with the owner entity on behalf of a user;
verifying, by the service-based web platform, authorization of the application to call the exposed web method based at least on whether the user is authorized to access the service-based web platform and has been granted authorization to call the exposed web method by the service-based web platform; and
denying, by the service-based web platform, access of the application to the stored data record associated with owner entity upon verifying authorization of the application to call the exposed web method unless:
the user is at least one of the owner entity or a user that has been explicitly granted access by the owner entity to the stored data record or a set of data records that includes the stored data record;
the application is registered with the service-based web platform;
the owner entity has explicitly granted the application access to a minimum required data record set that was specified by the application during registration; and
the stored data record is within the minimum required data record set.

17. The computer system of claim 16, wherein the memory further stores computer-executable instructions for:
registering, by the service-based web platform, the application in response to receiving a registration request and the minimum required data record set from the application;
presenting, by the service-based web platform, the minimum required data record set to the owner entity; and
obtaining, by the service-based web platform, consent from the owner entity to authorize the application to access the minimum required data record set.

18. The computer system of claim 16, wherein the memory further stores computer-executable instructions for:
creating, by the service-based web platform, one or more sets of data records associated with the owner entity; and
storing, by the service-based web platform, authorization rules desired by the owner entity for the one or more sets of data records as a whole.

19. The computer system of claim 18, wherein the memory further stores computer-executable instructions for:
superseding, by the service-based web platform, the authorization rules desired by the owner entity for the one or more sets of data records with system set authorization rules for individual data records in the one or more sets of data records that contain sensitive data; and
restricting, by the service-based web platform, access to the stored data record according to the system set authorization rules if the stored data record contains sensitive data, wherein the system set authorization rules satisfy a standard that governs access to the sensitive data contained in the stored data record.

20. The computer system of claim 16, wherein the memory further stores computer-executable instructions for:
verifying, by the service-based web platform, authorization of a device utilizing the application to request access to the stored data record associated with the owner entity, wherein the service-based web platform further denies access of the application to the stored data record associated with the owner entity unless the owner entity has explicitly granted access to the device.

* * * * *